(12) United States Patent
Nystad et al.

(10) Patent No.: US 9,367,953 B2
(45) Date of Patent: Jun. 14, 2016

(54) GRAPHICS PROCESSING SYSTEMS

(75) Inventors: Jørn Nystad, Trondheim (NO); Borgar Ljosland, Trondheim (NO); Edvard Sørgård, Hundhamaren (NO)

(73) Assignee: ARM Limited, Cambridge (GB)

( * ) Notice: Subject to any disclaimer, the term of this patent is extended or adjusted under 35 U.S.C. 154(b) by 746 days.

(21) Appl. No.: 12/477,500

(22) Filed: Jun. 3, 2009

(65) Prior Publication Data

US 2010/0060630 A1 Mar. 11, 2010

(30) Foreign Application Priority Data

Jun. 4, 2008 (GB) .................... 0810205.5

(51) Int. Cl.
*G06T 15/00* (2011.01)
*G06T 15/40* (2011.01)

(52) U.S. Cl.
CPC ...................... *G06T 15/40* (2013.01)

(58) Field of Classification Search
None
See application file for complete search history.

(56) References Cited

U.S. PATENT DOCUMENTS

| 5,734,806 | A | 3/1998 | Narayanaswami | |
|---|---|---|---|---|
| 6,094,200 | A | 7/2000 | Olsen et al. | |
| 6,456,285 | B2 * | 9/2002 | Hayhurst | 345/422 |
| 6,476,806 | B1 | 11/2002 | Cunniff et al. | |
| 6,952,217 | B1 | 10/2005 | Diard et al. | |
| 7,375,727 | B1 | 5/2008 | Greene et al. | |
| 7,388,581 | B1 | 6/2008 | Diard et al. | |
| 2001/0012018 | A1 | 8/2001 | Hayhurst | |
| 2002/0075260 | A1 * | 6/2002 | Brokenshire et al. | 345/420 |
| 2004/0130552 | A1 * | 7/2004 | Duluk et al. | 345/506 |
| 2005/0017971 | A1 | 1/2005 | Ard | |
| 2007/0268290 | A1 | 11/2007 | Naoi | |
| 2007/0268291 | A1 * | 11/2007 | Naoi | 345/422 |
| 2008/0100627 | A1 * | 5/2008 | Nystad et al. | 345/502 |

FOREIGN PATENT DOCUMENTS

| CN | 101067869 A | 11/2007 |
|---|---|---|
| EP | 0 854 441 | 7/1998 |
| EP | 1 804 187 | 7/2007 |
| GB | 2 354 926 | 4/2001 |
| GB | 2 420 261 | 5/2006 |
| JP | 08-055239 | 2/1996 |

(Continued)

OTHER PUBLICATIONS

Bartz, Dirk, et al. "Jupiter: A toolkit for interactive large model visualization." Parallel and Large-Data Visualization and Graphics, 2001. Proceedings. IEEE 2001 Symposium on. IEEE, 2001.*

(Continued)

*Primary Examiner* — Ulka Chauhan
*Assistant Examiner* — Sultana M Zalalee
(74) *Attorney, Agent, or Firm* — Nixon & Vanderhye P.C.

(57) ABSTRACT

When rendering a scene that includes a complex object made up of many individual primitives, rather than processing each primitive making up the object in turn, a bounding volume which surrounds the complex object is generated and the scene is then processed using the bounding volume in place of the actual primitives making up the complex object. If it is determined that the bounding volume representation of the object will be completely occluded in the scene (e.g. by a foreground object), then the individual primitives making up the complex object are not processed. This can save significantly on processing time and resources for the scene.

13 Claims, 7 Drawing Sheets

(56) References Cited

FOREIGN PATENT DOCUMENTS

| JP | 8-315180 | 11/1996 |
| JP | 2007-310798 | 11/2007 |

OTHER PUBLICATIONS

Bartz, Dirk, Michael Meiβner, and Tobias Hüttner. "Extending graphics hardware for occlusion queries in OpenGL." Proceedings of the ACM SIGGRAPH/EUROGRAPHICS workshop on Graphics hardware. ACM, 1998.*

Examination Report, Aug. 4, 2011, in United Kingdom Application No. GB0909641.3.

United Kingdom Examination Report, Jan. 16, 2012, in UK application No. GB0909641.3.

Combined Search and Examination Report, Oct. 26, 2012, in Application No. GB1208595.7.

English translation of Chinese Office Action, Oct. 30, 2012, in Chinese Application No. 200910159598.8.

English Translation of Japanese Office Action mailed Aug. 20, 2013 in Japanese Application No. 2009-134192.

English Translation of Chinese Office Action mailed Nov. 5, 2013 in Chinese Application No. 2009-10159598.

Japanese Notice of Allowance dated Mar. 31, 2014 in Japanese Application No. 2009-134192.

English translation of Chinese Office Action dated May 26, 2014 in CN 200910159598.8, 18 pages.

UK Combined Search and Examination Report issued Oct. 2, 2009 in GB 0909641.3, 7 pages.

* cited by examiner

GRAPHICS PROCESSING SYSTEMS

This application relates to the processing of graphics, and in particular to the processing of 3-dimensional (3D) graphics, for, e.g., display on a display screen.

As is known in the art, 3D graphics processing is normally carried out by first splitting the scene to be displayed into a number of similar basic components (so-called "primitives") to allow the 3D graphics processing operations to be more easily carried out. These "primitives" are usually in the form of simple polygons, such as triangles.

The primitives for a scene to be displayed are usually generated by the applications program interface for the graphics processing system, using the graphics drawing instructions (requests) received from the application (e.g. game) that requires the display of the graphics.

Each primitive is at this stage usually defined by and represented as a set of vertices. Each vertex for a primitive has associated with it a set of data representing the vertex. This data is then used, e.g., when rasterising and rendering the vertex (the primitive(s) to which the vertex relates) for display.

The data that is associated with each vertex will typically comprise, as is known in the art, position data for the vertex (its (x, y, z) coordinates in the "scene world"), and a set of "attributes" data, defining the attributes of the vertex (i.e. how it should be drawn and/or will appear on the display). This attributes data can include, e.g., colour and transparency data for the vertex (red, green, blue and alpha, (RGBa) values), texture data for the vertex (typically (s, t) coordinate data for a texture map to be applied to the vertex), information relating to the orientation of the face of the primitive to which the vertex belongs, etc.

The data for each vertex is typically arranged as an array of vertex data containing the vertex data for, e.g., each and every vertex needed to display a given graphics scene or frame. The stored data in the vertex array may also indicate which vertices represent which primitives in the scene (frame), e.g. by associating each vertex with its respective primitive(s). (Alternatively, the association of vertices to primitives could be provided in some other manner, for example by preparing lists of primitives (so-called "primitive lists") and/or of "draw primitive(s)" graphics commands which indicate for each primitive which vertices in the vertex data array are to be used for the primitive.)

Once all the primitives for a scene and their vertices have been generated and defined, they can be processed by the graphics processing system, in order to display the scene.

As is known in the art, this processing typically involves a number of stages.

Firstly, a number of operations are carried out on the primitives themselves (in practice on the vertex data generated for the primitives). These processes may include, as is known in the art, transforming (e.g. rotating, scaling, displacing, etc.) the primitives, and "lighting" the primitives (e.g. to adjust their appearance depending on the light sources in the scene to be displayed).

These processes are carried out using the defined vertex data, and result in modified vertices (vertex data) which represent the transformed and lit, etc., primitives. As these operations are carried out on the vertex data, and result in modified vertex data (vertices), they can be thought of as, and are commonly referred to as, "vertex shading" processes.

These vertex shading steps can be carried out, as is known in the art, by dedicated, "fixed-function" processing units or stages, and/or by programmable or configurable units that execute one or more vertex shading programs (which units are commonly referred to as (programmable) "vertex shaders").

Once the above processes are completed, the processed (vertex shaded) vertex data will represent the primitives as they are to be displayed on a 2D surface. It is then necessary to convert that data to a form appropriate for display on a display (e.g. screen). This process basically involves determining which pixels (picture elements) on the display screen will represent which primitive, and determining the appearance each pixel should have on the display (e.g. in terms of its colour, etc.). These processes are commonly referred to as rasterising and rendering, respectively.

This process basically involves determining which sampling points of an array of sampling points covering the scene to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the scene to be displayed). This is typically done using the positions of the vertices of a primitive.

The rendering process then derives the data, such as red, green and blue (RGB) colour values and an "Alpha" (transparency) value, necessary to display the primitive at the sample points (i.e. "shades" each sample point). This can involve, as is known in the art, applying textures, blending sample point data values, etc.

(In 3D graphics literature, the term "rasterisation" is sometimes used to mean both primitive conversion to sample positions and rendering. However, herein "rasterisation" will be used to refer to converting primitive data to sampling point addresses only.)

These processes are typically carried out by "representing" the sampling points as discrete graphical entities usually referred to as "fragments" on which the graphics processing operations (such as rendering) are carried out. Each such fragment will correspond to a given sampling point or set of sampling points and, in effect, represent and be used to render a primitive at the sampling point or points in question (the sampling point(s) which the fragment is being used to render).

A "fragment" is therefore effectively (has associated with it) a set of primitive data as interpolated to a given screen space sample point (or points) of a primitive. It may also include per-primitive and other state data that is required to shade the primitive at the sample point(s) (fragment position) in question. Each graphics fragment can reasonably be thought of as being effectively equivalent to a "pixel" of the scene as it is processed.

Indeed, each graphics "fragment" may correspond to a single pixel (picture element) in the final display (since as the pixels are the singularities in the final display, there may be a one-to-one mapping between the "fragments" the graphics processor operates on (renders) and the pixels of the display). However, it can be the case that there is not a one-to-one correspondence between a fragment and a display pixel, for example where particular forms of post-processing, such as down-scaling, are carried out on the rendered image prior to displaying the final image.

In one known technique for graphics processing, which is commonly referred to as "immediate mode" graphics processing or rendering, the vertices are processed (rasterised and rendered) as they are generated, one after another.

In this type of system, the vertices are passed to the graphics system on a first-come, first-served basis (although the vertices will normally be sorted in some manner to try to improve the efficiency of the graphics processing), and primitives are thus rendered for display in the order that they are received.

It is also known in graphics processing systems to use so-called "tile-based" or "deferred" rendering. In tile-based rendering, rather than the entire scene effectively being processed in one go as in immediate mode rendering, the scene to be displayed is divided into a plurality of smaller sub-regions, usually referred to as "tiles". Each tile (sub-region) is rendered separately (typically one-after-another), and the rendered sub-regions (tiles) are then recombined to provide the complete scene for display. In such arrangements, the scene is typically divided into regularly-sized and shaped sub-regions (tiles) (which are usually, e.g., squares or rectangles), but this is not essential.

In a tile-based rendering system, it is usual to prepare for each sub-region (tile) a list (a "tile list") of the primitives that are to be rendered for that sub-region (i.e. that appear in the sub-region). This helps to avoid unnecessarily rendering primitives that are not actually present in a tile.

In order to prepare the tile lists in a tile-based rendering system, the initial vertices (vertex data) for the primitives are first vertex shaded to determine, e.g., whether and how each primitive will appear in the scene to be displayed. The processed (vertex shaded) vertices are then used to determine which primitives will (potentially) appear in each tile.

Once tile lists have been prepared for each sub-region (tile) in this way, the tile-lists are stored for use, e.g., to allow the system to identify which primitives need to be considered (and rendered) when the tile in question is rendered.

Thus, a tiling-based system can be looked upon as performing three main steps. Firstly, vertex shading is performed for each primitive. The "vertex shaded" vertex data is then "tiled" (i.e. the lists are prepared using the processed (vertex shaded) vertex data). Each tile is then rasterised and rendered in turn.

It is an increasing trend for scenes to be rendered by graphics processing systems to become more and more complex, for example in terms of the number of primitives that may be used to draw a scene. The vertex shading programs that are used when processing scenes for display are also becoming increasingly complex. This all places increasing processing and resource requirements and burdens on graphics processing systems.

It would be desirable to reduce these burdens and requirements, even if the scene "presented" to the graphics processing system for processing for display is a complex one, and while some techniques for doing this, such as the use of early Z-testing and occlusion culling to try to reduce the number of primitives that are ultimately rendered for a scene exist, the Applicants believe there remains scope for improvements in this regard.

According to a first aspect, there is provided a method of processing a scene for display in a graphics processing system, the method comprising:

identifying an object in the scene;

generating a volume for representing the object in the scene;

processing some or all of the scene using the generated volume for the object to assess the presence of an object in the scene; and determining whether or not to process an object of the scene for display on the basis of the assessment.

According to a second aspect, there is provided a graphics processing system comprising:

means for identifying an object in a scene to be processed for display;

means for generating a volume for representing the object in the scene;

means for processing some or all of the scene using the generated volume for the object to assess the presence of an object in the scene; and means for determining whether or not to process an object of the scene for display on the basis of the assessment.

A volume is generated for representing an object (such as a more complex object, such as an object that is or will or could be made up of plural primitives), and then that generated representative volume is processed to derive information relating to the presence of the object and/or of another object or objects in the scene. In other words, a "proxy" representative volume is generated for the object and processed first, before, for example, processing all the "true" primitives that make up the object in question.

This has the advantage that, for example, and as will be discussed further below, if it can be determined from the proxy-representative volume that the object will not in fact be seen in the scene as it is to be displayed (e.g. because it in fact falls outside the displayed frame, or it is completely occluded by other objects), then the plural "true" primitives for the object need not be processed at all, thereby avoiding that processing burden and requirement when processing the scene for display (and accordingly saving power and bandwidth).

Similarly, if it can be determined from the proxy-representative volume that the object will completely occlude another object in the scene as it is to be displayed, then the plural "true" primitives for that other object need not be processed at all, thereby avoiding that processing burden and requirement when processing the scene for display (and accordingly saving power and bandwidth).

Thus the technology described can, for example, allow the unnecessary processing of objects in a scene to be avoided if the object will not in fact be visible in a scene to be displayed, by first processing a more abstract or coarser representation of an object (i.e. the volume generated as representing the object) to assess the object's effect (e.g. presence (visibility) or otherwise) in the scene as it will be displayed.

The object for which a representative volume (a coarser representation) is generated can be any suitable and desired such object. It preferably comprises a more complex object, such as, and preferably, an object that is or that will be (when it is rendered) made up of many individual primitives, as it is the assessment of such objects that would be most advantageous.

In one particularly preferred embodiment, the object for which a bounding volume is generated comprises a draw call (the primitives of a draw call), a combination of draw calls or a part of a draw call (e.g. a particular "object" primitive grouping from a draw call). In a preferred embodiment it comprises a draw call.

In another particularly preferred embodiment, the object comprises a more abstract, higher order object (description of an object) to be drawn, such as, and preferably, a so-called "patch" or "surface". Thus, in a preferred embodiment, the object comprises a higher order parametric description of an object to be drawn. The technology described may be, for example, and is preferably, applied to objects that are defined, e.g., in terms of control points (and other information), such as (stroked) curves, surfaces, patches, etc., as it is readily possible to (and advantageous to) generate volumes representing such objects (objects defined or described in that form).

It will also be appreciated that with such higher order "objects", such objects may still typically ultimately be rendered as plural primitives, so it is advantageous to use the described technology in relation to them.

The object to be processed can be determined and identified as desired, e.g., by identifying a draw call or draw calls of the scene, by analysing a draw call or draw calls to see how objects and/or primitives, etc., are grouped in the draw call or draw calls, by identifying higher order object descriptions for the scene, by identifying an object that is or will be comprised of plural primitives in the scene, etc.

The assessment of the presence of an object in the scene that is carried out using the representative volume for the object may be done in any suitable and desired manner. It preferably comprises assessing whether an object (or objects) will be visible in the scene as it will be displayed or not.

This may, as will be discussed further below, be done in relation to the object for which the volume is generated, and/or in relation to another object (or objects) in the scene. In effect, the effect of the object on the scene should be assessed.

Similarly, the determination of whether or not to process an object of the scene for display based on the assessment may be done in relation to the object for which the volume is generated, and/or in relation to another object (or objects) in the scene.

In a particularly preferred embodiment, the "volume" that is generated as representing the object comprises a bounding volume for the object (i.e. a volume that will "bound" or encompass the object, so as to represent at least the volume that would be occupied by the object).

This has the advantage that, for example, and as discussed herein, if it can be determined from the proxy-bounding volume (the bounding volume representation) that the object will not in fact be seen in the scene as it is to be displayed (e.g. because it in fact falls outside the displayed frame, or it is completely occluded by other objects), then the, e.g., plural "true" primitives for the object need not be processed at all, thereby avoiding that processing burden and requirement when processing the scene for display (and accordingly saving power and bandwidth).

These embodiments, comprise steps of or means for:
identifying an object (e.g. that is comprised of plural primitives) in the scene;
generating a bounding volume for representing the object in the scene;
processing some or all of the scene using the generated bounding volume for the object to assess (e.g. to derive information relating to) the presence of the object in the scene; and
using the assessment (e.g. the derived information) to determine whether or not to process the object (e.g. to determine whether or not to process one or more of the plural primitives of the object) for display.

The bounding volume that is generated as a coarser representation of the complex object can take any desired and suitable form.

In a particularly preferred embodiment, the bounding volume is in the form of a bounding box that surrounds the object.

In another embodiment, the bounding volume may, for example, comprise a 2-dimensional mapping of the object (to represent the area covered by the object) together with a, preferably conservative, depth range for the object (an indication of the range of depth values that the object extends over) (which will thereby indicate the "depth" that the object should be considered to occupy). In this case, as will be appreciated by those skilled in the art, the 2D mapping and depth range will effectively define together a bounding volume for the object.

The bounding volume that provides the coarser representation of the object can be generated in any desired and suitable manner, once the object in question has been identified.

Thus, in the case of a bounding box representation, any suitable technique for deriving a bounding box that surrounds (and encompasses) the complex object can be used to generate the bounding box that will form the coarser representation of the complex object.

The bounding volume may be a more or a less accurate representation of the volume the object occupies (a better or worse "fit" to the true volume (shape) of the (complex) object), as desired.

It would also, e.g., be possible to generate and then process a set of plural "representative" volumes that together make up an overall bounding volume for the object (and in one preferred embodiment this is done). In this case the "bounding volume" would be comprised of a set of plural smaller "volumes". This may, e.g., allow a more accurate representation of the volume occupied by the object to be generated, if desired. This may be particularly desirable for objects having shapes that cannot easily be represented accurately using a single, "global", bounding volume. (Alternatively, such an "object" could be treated as plural individual, smaller objects, each of which is then processed.)

(As will be appreciated by those skilled in the art, and as discussed above, the bounding volume that is used and tested in these embodiments should "bound" or encompass the object, so as to represent at least the volume that would be occupied by the object. Thus where the bounding volume is comprised of plural smaller volumes (that therefore may not individually fully "bound" the object), the arrangement should be that the combination of the smaller volumes will fully "bound" the object.)

The bounding volume, e.g., bounding box, comprising the coarser representation of the object may be generated from the transformed or the untransformed vertex data of primitives making up the complex object.

Thus, in one preferred embodiment, the bounding volume representation, e.g., and preferably, bounding box, that is to represent the complex object is generated from the untransformed vertex data of primitives making up the complex object, and then the bounding volume representation of the complex object is transformed to the screen space for processing.

In another preferred embodiment, vertices making up primitives of the complex object are first transformed to the screen space, and then the bounding volume representation, such as a bounding box, for representing the complex object is generated using the transformed vertices (vertex data). In this arrangement, the transformed "true" vertex data for the complex object could be, and in a preferred embodiment is, cached so that it will be available for future use if required.

The initial transformation step can be performed, e.g., in a dedicated unit provided in the graphics processing system, such as, e.g., a CPU core with the necessary software programs implemented. However, it is preferably performed in a vertex shader unit of the graphics processing system, using, e.g., a suitable pre-generated vertex shader program, or a vertex shader program extracted (e.g. at the compiler stage) from the application specified vertex shader program(s) to be used for vertex shading for the scene in question. In the latter case, the system compiler could, e.g., generate a "special" version of the vertex shader program for the (each) vertex in question from the actual, full vertex shader program. This special, reduced version of the vertex shader program preferably contains, e.g., only the transform instructions on the (x, y, z) coordinates for each vertex necessary to deduce the position of the vertex will have after vertex shading. The compiler may, e.g., have an additional analysis and dead-code elimination step for all vertex shader programs supplied by the application to facilitate this, if desired.

The processing that is carried out using the generated bounding volume that is the coarser representation of the (complex) object is preferably so as to assess (e.g. to derive information relating to) the presence of the object in the scene and can be any desired and suitable such processing. It preferably assesses whether the complex object would or could be visible in the scene as it is to be displayed.

The processing that is carried out using the generated bounding volume could, and in a preferred embodiment does, comprise assessing whether the bounding volume representing the object will fall completely outside the visible area of the scene (as it will be displayed) (as in this case it can be concluded that the complex object need not be processed for the scene at all). This could be done, e.g., and preferably, by assessing whether the bounding volume representing the object falls entirely outside the screen edges, and/or, in a tiling system, by assessing whether the bounding volume representing the object falls in any tile to be used for displaying the scene or not.

In a particularly preferred embodiment, the processing that is carried out using the generated bounding volume that is the coarser representation of the (complex) object to derive information relating to the presence of the object in the scene comprises assessing whether the bounding volume representing the object will be completely and/or partially occluded by other objects in the scene. This again will provide information on whether the (complex) object will actually be visible in the scene as it is to be displayed (and accordingly needs fully processing for display or not).

Such assessment of whether the bounding volume representing the object is occluded or not can be performed as desired, but preferably comprises carrying out Z(depth)-tests and/or other forms of graphics occlusion testing, for example, and preferably, as are known in the art.

Such processing of the bounding volume representing the object can be carried out as desired, but in a particularly preferred embodiment comprises processing the bounding volume in place of the "true" primitives defined for the (complex) object in question when processing the scene in question for display. In other words, the generated bounding volume representing the (complex) object is processed along with the other objects and/or primitives of the scene for display, instead of processing the individual, "true" primitives making up the (complex) object in question.

The processing of the bounding volume may be implemented, e.g., by generating an appropriate primitive or primitives to represent the bounding volume and then processing the primitive(s) representing the bounding volume in the same manner as any other primitive of the scene, i.e. the generated primitives representing the bounding volume are preferably processed along with (preferably all of the) other primitives defined for the scene (and accordingly binned into tiles (in a tile-based rendering system), rasterised and rendered, etc., as appropriate).

(It will be appreciated here that even where a primitive or primitives are generated in order to be able to process the bounding volume, that should still require fewer primitives to be processed than if the (complex) object were simply processed in the normal fashion.)

Other arrangements would, of course, be possible.

While it would be possible to process the generated bounding volume representing the complex object (and/or the primitive(s) representing the bounding volume) completely as if it were any other object and/or primitive, the applicants have recognised that deriving, e.g., colour information, for the bounding volume representing the (complex) object may not be necessary (since the bounding volume that is the coarser representative of the (complex) object is not intended to actually contribute to the scene that is displayed).

Thus, in a particularly preferred embodiment, the processing that is carried out in respect of the generated bounding volume representing the (complex) object comprises performing only the processing necessary to determine the presence (or otherwise) of the generated bounding volume in the scene as it will be displayed.

Such processing preferably comprises any necessary transformations of the generated bounding volume (or of the vertices from which the bounding volume will be derived) to the appropriate position(s) in the scene as it will be displayed (as this will then allow the presence of the complex object in the scene as it will be displayed to be assessed).

Similarly, in the case of a depth-test based occlusion determination, the processing of the generated bounding volume representing the (complex) object preferably comprises performing a Z-only (depth-only) rendering pass in respect of the bounding volume, i.e. a rendering pass in which the bounding volume is rendered, but in which the only render states that are enabled for the bounding volume are reads and writes of Z and the Z test.

Preferably the bounding volume representing the (complex) object (e.g. the primitives representing the bounding volume) is rendered in an appropriate manner (and preferably in the normal fashion for the graphics processing system in question so far as the depth (or other) testing is concerned) when it is processed to allow the depth (or other) testing to be performed.

Limiting the processing performed in relation to the generated bounding volume representing the complex object also has the advantage that that processing can be more efficient and consume less resources, thereby making it, for example, more acceptable to perform in more constrained systems. For example, in the case of a Z-only processing, the Z-buffer can be filled, but other memory accesses can be reduced or minimised and the fragment processor may be left idle.

The graphics processing system can be configured in any suitable and desired manner to process the generated bounding volume representing the (complex) object in this manner. Preferably it is set to an appropriate render state for this purpose (such as a Z-only render state). (As is known in the art, the render state that a graphics processor is set to determines the processing that the processor will perform on graphics primitives that it receives and so can be used to control the processing that is carried out.)

The (render) "state" for this purpose could, e.g., be set by flushing the processor and setting its state to the new (e.g. Z-only) state globally (i.e. for all processing units), as is known in the art, before sending the bounding volume (e.g. primitive(s)) representing the (complex) object for processing.

However, in a preferred embodiment, the bounding volume and/or its corresponding primitive(s) representing the (complex) object is tagged or marked in some way to identify itself as to undergo such particular processing, and the graphics processing system is configured to process such tagged "objects" (and primitives) accordingly (and appropriately).

For example, where the graphics processing system has a number of predefined rendering states that can, e.g., be associated with primitives and/or fragments, such as in the techniques described in the Applicant's earlier patent application GB-A-2420261, then preferably one of the available predefined rendering states (such as rendering state index "0" (or another index)) is set to the render state that is to be used for processing bounding volumes representing (complex) objects (e.g., and preferably, a Z-only rendering state). This would then allow, e.g., such bounding volumes (and/or primitives, fragments, etc.) to be tagged with the appropriate rendering state index, etc., as they are sent for processing pass, so that they are processed accordingly, rather than, e.g., having to flush and change globally the state of the entire processing pipeline.

It is similarly preferred where the graphics processing system supports fragment shading programs, for there to be a predefined fragment program address that is reserved for and used for the processing of bounding volumes representing (complex) objects (e.g. that are to undergo Z-only processing (render state)). This address could, e.g., trigger (the compilation and execution of) a more limited version of an, e.g., overall fragment shader program for processing the generated bounding volume. This would again then allow such bounding volumes (and primitives and fragments) to be tagged with this predefined fragment program address when undergoing processing, and accordingly avoid, e.g., the need to apply a global (e.g. Z-only) state to the graphics processor.

Once the presence (e.g. visibility) or otherwise of the bounding volume representing the (complex) object in the scene has been assessed, that information is then used to determine whether or not to process the object (e.g. the "true" primitives making up the (complex) object).

This may be done in any desired and suitable manner, but in a preferred embodiment if it is determined from the processing of the bounding volume representing the object that the object will not be present (e.g., and preferably, visible) at all in the scene as it will be displayed (e.g. because the generated bounding volume falls entirely outside the edge of the visible frame, is not in a tile to be used for the scene as it is to be displayed, and/or is completely occluded by other objects in the scene), then the (complex) object corresponding to the generated bounding volume is preferably simply rejected, e.g., culled, from the scene, such that it does not undergo any further processing in respect of the scene.

On the other hand if the processing of the bounding volume representing the object determines that the object will (at least in part) be present (e.g. visible) in the scene as it is displayed, then the object will require processing "properly" for display. (This is necessary as the processing of the bounding volume representing the object cannot in itself be used to display the object).

This is preferably achieved by then causing the graphics processing system to process one or more (e.g. all) of the individual, actual (true) primitives that are or will be defined for the complex object for display. In other words, the original data (e.g. primitives) that the generated bounding volume (coarser representation of the object) represents should be processed.

In this case, the "true" primitives for the object are preferably processed in the normal fashion for display, and thus should undergo any necessary tiling, rasterising, rendering, etc., operations as necessary and as appropriate.

This processing of the "true" primitives for the complex object may, if desired, use any already derived and stored data in respect of those primitives if desired, such as any cached transformed vertex data, as discussed above.

The "true" processing of the object (the processing of the "true" primitives for the object) in these circumstances may be triggered as desired once it is determined that the (complex) object should be processed for display (e.g. will be visible). However, in a preferred embodiment, the bounding volume representation of the (complex) object has associated with it information that will trigger the processing of the actual primitives of the (complex) object, and/or that can be used to identify the actual primitives that need to be processed for the (complex) object in question.

Although the present embodiment has been described above primarily as testing a single bounding volume (e.g. bounding box), or a set of volumes together making up an overall single bounding volume, as a coarser representation of a complex object to be drawn (and in one preferred embodiment this is what is done), it would, for example, be possible to test two or more volumes making up the bounding volume representing a given more complex object separately if desired. For example, testing plural volumes representing a complex object separately could allow the presence and visibility of different parts of a complex object in a scene to be assessed.

Thus, in a particularly preferred embodiment, two or more representative volumes (that together make up the bounding volume) are generated for representing the (complex) object and tested separately. In this case each such generated volume preferably represents a plurality of actual primitives making up the object. The generated representative volumes in these arrangements preferably each represent different parts of the object in question, and are preferably generated so as to represent different (screen) areas of the object.

In one preferred embodiment, two or more representative volumes representing the complex object are generated from the outset.

However, in a particularly preferred embodiment, the system initially generates a single bounding volume for representing the entire complex object and then progressively generates more representative volumes, each representing progressively smaller parts of the (complex) object, if and as it is determined that the object and then parts of the object are present in and should be processed for the scene as it will be displayed.

This arrangement, in effect, progressively divides the (complex) object into smaller parts, each represented by a generated representative volume (that will "bound" the part of the object in question), and thereby allows the presence or otherwise of each such part of the object in the scene to be assessed and rejected at the appropriate "representation" level (resolution) if all or part of the object is not present in the scene as it will be displayed.

In these arrangements, preferably an iterative procedure of progressively generating smaller volumes representing the (complex) object is used (as long as at least part of the object remains "present" in the scene at each stage).

Thus, preferably, the (complex) object is first represented by a single bounding volume generated to represent it, and the presence of that generated bounding volume assessed. If not present in the scene, the (complex) object can be rejected at this stage, but if that bounding volume is present, then preferably two or more (and preferably 2 or 4) volumes each representing different parts of the object (and parts of the original, overall bounding volume) are generated and their presence assessed.

This process can be continued as and if desired, such that, for example, if either of the, e.g., two "second-level" generated volumes is found to be present in the scene as it will be displayed, then two (or more, etc.) smaller volumes are generated as representing the part of the (complex) object that the generated "second-level" volume corresponded to, and assessed, and then either rejected, or the corresponding true primitives for that "part" of the (complex) object are processed for display, or that "part" of the (complex) object is further subdivided, and so on.

Thus, in a particularly preferred embodiment, if it is determined that an initially generated bounding volume representing an object will be present in the scene as it will be displayed, rather than then immediately processing the "true" primitives making up the represented object for display, instead two or more (and preferably 2 or 4) smaller representative volumes each representing different parts of the object are generated and processed.

Then, in a preferred embodiment, for any of these smaller volumes that are found to be present in the scene as it is displayed, either the "true" primitives for that part of the (complex) object are processed for display, or two or more (and preferably 2 or 4) smaller volumes each representing different parts of that (smaller) part of the (complex) object are generated and processed.

This process can then in a preferred embodiment be repeated in respect of these smaller "parts" of the (complex) object, if desired, such that again, for any of these smaller representative volumes that are found to be present in the scene as it is displayed, either the "true" primitives for that part of the (complex) object are processed for display, or two or more (and preferably 2 or 4) smaller volumes each representing different parts of that (smaller) part of the (complex) object are generated and processed, and so on.

Preferably the subdivision is continued until some particular, preferably selected or selectable, and preferably predetermined, subdivision limit is reached. This limit could, e.g., be in terms of the number of subdivisions that are made, and/or in terms of the size of the different parts (regions) that the object is divided into (and/or of the volumes that are generated for representing the parts of the object).

As will be appreciated by those skilled in the art, the level and limit of such sub-division to be used may depend, e.g., on the trade-off between the increased processing that further sub-division entails against the potential saving from eliminating a part of a complex object from being processed. Thus, for example, higher levels of sub-division may be desirable for particularly complex objects (e.g. objects made up of many primitives) and vice-versa.

In these arrangements, the generated volumes used to represent the (complex) object at each level of subdivision of the object or part of the object preferably are all the same or similar size, and, most preferably, the same or a similar shape. In a preferred embodiment they are each cuboids, and preferably cubes.

In a preferred embodiment, the subdivision of the (complex) object in this manner is such that the object can be represented by a single generated bounding volume (that covers all of the object), then by four (smaller) generated volumes each representing different parts of the object (i.e. such that the object is effectively divided into four regions).

Similarly, any smaller representative volume (part of the object) found to be present is preferably again divided into four smaller parts (such that if all four representation volumes from the initial subdivision are found to be present, the object will then effectively be divided into 16 regions, each represented by a different generated representative volume).

Again, any of these such smaller representative volumes found to be present, if they are to be sub-divided, are preferably sub-divided into four smaller parts, each represented by a generated volume (such that if all 16 smaller volumes are still present, the object will then be divided into 64 regions), and so on, as desired.

In another particularly preferred embodiment, the volume that is generated for representing the object comprises a bounded volume for the object, i.e. a volume that is definitely enclosed within (bounded by) the object (that occupies not more than the volume that will be occupied by the object).

The Applicants have further recognised that it would, for example, equally be possible to test whether an object may occlude other objects in the scene (which objects could then be discarded accordingly). In such an arrangement a coarser representation of the complex object would again be generated and used in the occlusion testing process, but in this case to determine whether or not other objects in the scene can be discarded as being occluded by the (complex) object in question.

The Applicants have further appreciated that in this case, it will not be appropriate to generate a bounding volume that encompasses the complex object (because a "bounding" volume will not represent exactly the volume (space) in the scene occupied by the complex object). Thus, for this processing, instead a "bounded" volume, i.e. a volume that is definitely enclosed within the complex object (i.e. that occupies not more than the volume that will be occupied by the complex object), is generated.

Thus, in an example preferred embodiment, a bounded volume is generated for representing an object in a scene, and then that generated bounded volume is processed to assess (e.g. to derive information relating to) the presence of the object in the scene. In other words, a "proxy" bounded volume (bounded volume representation) is generated for the object and processed first, before, for example, processing all the "true" primitives that make up the object in question.

This has the advantage that, for example, and as will be discussed further below, if it can be determined from the proxy-bounded volume (the bounded volume representation) for the object that the object will occlude other objects in the scene as it is to be displayed, then those other objects need not be processed at all, thereby avoiding that processing burden and requirement when processing the scene for display (and accordingly saving power and bandwidth).

Thus, a particularly preferred embodiment comprises steps of or means for:
identifying an object (e.g. that is comprised of plural primitives) in the scene;
generating a bounded volume for representing the object in the scene;
processing some or all of the scene using the generated bounded volume for the object to assess (e.g. to derive information relating to) the presence of another object or objects in the scene; and
using the derived information to determine whether or not to process one or more other objects of the scene for display.

As will be appreciated by those skilled in the art, these embodiments can and preferably do include and one or more or all of the preferred and optional features described herein, as appropriate.

Thus, for example, any or all of the optional and preferred techniques discussed herein in relation to the use of a "bounding volume", may equally be applied to arrangements where a "bounded volume" is generated for an object, as appropriate.

Thus, the bounded volume is preferably generated by considering the appropriate x, y and z value ranges that will definitely be encompassed by the object (and/or by a part or parts of the object).

Similarly, once the appropriate bounded volume for the (complex) object has been derived, then again the scene can be processed using that bounded volume to represent the object, preferably to determine whether accordingly the object will occlude any other objects, primitives, etc., that appear in the scene (such that they can then be discarded (not processed for display)).

In a particularly preferred embodiment, the processing that is carried out using the generated bounded volume that is the coarser representation of the object comprises assessing whether the bounded volume representing the object will completely and/or partially occlude any other objects in the scene. This will provide information on whether the other object or objects will actually be visible in the scene as it is to be displayed (and accordingly need fully processing for display or not).

Such assessment of whether the bounded volume representing the object occludes another object or not can be performed as desired, but again preferably comprises carrying out Z(depth)-tests and/or other forms of graphics occlusion testing, for example, and preferably, as are known in the art.

Thus, the processing in respect of the bounded volume is similarly preferably performed as a Z-only rendering pass, and is preferably used in a corresponding manner to the "bounding volume" processing discussed above to allow objects that will be occluded by the (complex) object to be discarded.

It will be appreciated here that the generation and testing of the bounded volume for an object should be carried out in an appropriately conservative basis, to ensure that bounded volume does not, for example, encompass any scene volume or area that is not in fact occupied by the object it represents.

The bounded volume may be derived to be a more or less accurate representation of the object, and/or a part or parts of the object, as desired.

It would also, e.g., be possible to generate and then process a set of plural bounded volumes to, e.g., more accurately represent the volume occupied by the object, if desired (and in a preferred embodiment this is done). This may be particularly desirable for objects having shapes that cannot easily be represented sufficiently accurately using a single bounded volume.

In a particularly preferred embodiment, both a bounding volume and a bounded volume is generated for a given object and then processed in the manner discussed above. Most preferably this is done for a plurality of (complex) objects in the scene, as that may then, e.g., allow one or more of those objects to be discarded from processing for the scene.

It will be appreciated from the above, that all the arrangements involve first processing a more abstract or coarser representation of the complex object (i.e. the bounding and/or bounded volume generated as representing the object) to assess the complex object's presence (visibility) or otherwise and/or effect in the scene as it will be displayed.

Thus, according to a third aspect, there is provided a method of processing a scene for display in a graphics processing system, the method comprising:

the graphics processing system:

generating a coarser representation of an object of the scene; and processing the generated coarser representation of the object to assess the visibility of an object or objects in the scene to be displayed.

According to a fourth aspect, there is provided a graphics processing system comprising:

means for generating a coarser representation of an object of a scene to be displayed; and means for processing the generated coarser representation of the object to assess the visibility of an object or objects in the scene to be displayed.

As will be appreciated by those skilled in the art, these aspects can and preferably do include any one or more or all of the preferred and optional features, as appropriate. Thus, for example, the object for which a coarser representation is generated preferably comprises a more complex object, such as an object made up of many individual primitives.

Similarly, these aspects preferably comprise steps of or means for identifying an object comprised of plural primitives in the scene, and then generating a coarser representation of that identified object for representing the object in the scene.

Equally, in one preferred embodiment of these aspects, the coarser representation of the object comprises a bounding volume for representing the object in the scene. In this case, the assessment of the visibility of an object or objects in the scene to be displayed preferably then comprises steps of or means for processing some or all of the scene using the generated bounding volume for the object to derive information relating to the presence of the object in the scene.

Similarly, in another preferred embodiment, the coarser representation of the object that is generated comprises a bounded volume for representing the object in the scene. In this case, the processing of the generated coarser representation of the object preferably comprises processing some or all of the scene using the generated bounded volume for the object to derive information relating to the presence of an object or objects in the scene.

In a particularly preferred embodiment, both a bounding volume and a bounded volume is generated for the object, as discussed above.

Similarly, the methods and system of these aspects preferably comprise steps of or means for using the assessment of the visibility of an object or objects in the scene to be displayed to determine whether or not to process the object in question and/or whether or not to process one or more other objects of the scene for display.

It should also be noted here that in all of the aspects and embodiments described herein, there may be more than one object in a given scene for which a representative coarser representation, bounding volume or volumes and/or bounded volume or volumes is or are generated and assessed. Indeed, in a preferred embodiment this is the case. In this case, each such object may be and should be treated and processed in the manners discussed above.

As will be appreciated from the above, arrangements may initially process vertices of or representing the (complex) object in a more limited fashion, more particularly in relation to their "positions" only.

The Applicants believe that carrying out such "in advance" processing using only a limited set of data may be new and advantageous in its own right, since it may, e.g., facilitate performing "in advance" processing, for example, in situations where processing power and memory resources are more limited, such as in embedded systems and portable devices, and, indeed, may allow such processing to be performed in situations where it may otherwise be undesirable to do so (for example because the processing burden would normally be considered to be too onerous).

Thus, according to a fifth aspect, there is provided a method of operating a graphics processing system, the method comprising:

the graphics processing system:

processing only data that relates to the position of a vertex or vertices of a set of vertices to be processed for display in advance of processing the set of vertices for display; and using the results of the processing when processing the set of vertices for display and/or to modify the set of vertices to be processed for display.

According to a sixth aspect, there is provided a graphics processing system, comprising:

means for only processing data that relates to the position of a vertex or vertices of a set of vertices to be processed for display in advance of processing the set of vertices for display; and means for using the results of the processing when processing the set of vertices for display and/or to modify the set of vertices to be processed for display.

As will be appreciated by those skilled in the art, these aspects and embodiments can and preferably do include any one or more or all of the preferred and optional features described herein, as appropriate. Thus, for example, the processing that is carried out on or using the position data for or related to the vertex or vertices, preferably comprises transforming the position data (i.e. deriving the position data for (in) the scene as it is to be displayed corresponding to the position data).

The data that relates to the position of vertices of the set of vertices that is processed in advance in these aspects, and in embodiments, can be any suitable and desired such data, i.e. data that affects or defines the position of a vertex or vertices.

Thus it could, for example, and preferably does, comprise the position data (the x, y, z data) for the vertices in question. However, it could also be other data that may affect a vertex's position, such as colour data for a vertex (e.g. where the colour of a vertex defines or affects its position).

The position related data could also or instead be data that is derived from or related to position data of the vertices position data of a bounding volume, such as a bounding box, that is to represent the position(s) of the "true" vertices of an object.

In a preferred embodiment, the position data that is processed in these aspects and embodiments o relates to a set of the vertices of a (complex) object that is to be processed for display, as discussed above. It may also, or instead, in these aspects, comprise, e.g., the vertices necessary to process an entire scene for display, etc., as desired.

In some cases, for example where a vertex in the set of vertices only has position-related data defined for it (e.g. because its attributes are otherwise to be set to predefined default values), the position-related data that is processed in advance will comprise all the data that is defined (and stored) for a vertex.

However, more typically the position-related data will comprise a subset of the data defined for a vertex, for example because the vertex will have both position-defining or affecting data defined for it, and other data, such as attributes such as colour or textures, that do not relate to or affect the vertex's position.

Thus in a particularly preferred embodiment, the position related data that is processed in advance comprises only a subset of the data defined for or related to a or each vertex in question. Similarly, the embodiment accordingly preferably comprises means for or a step of processing only a subset of the data defined for or related to a vertex or vertices of a set of vertices to be processed for display in advance of processing the set of vertices for display.

Indeed, the Applicants believe that the idea of processing only a subset of data defined for vertices to be processed for display in advance of processing the vertices for display may be new and advantageous in its own right, since it could, for example, similarly facilitate processing and resource savings, even when it is not only position-related data that is being processed in this manner.

Thus, according to a seventh aspect, there is provided a method of operating a graphics processing system, the method comprising:

the graphics processing system:

processing only a subset of the data defined for a vertex or vertices of a set of vertices to be processed for display in advance of processing the set of vertices for display.

According to an eighth aspect, there is provided a graphics processing system, comprising:

means for only processing a subset of the data defined for a vertex or vertices of a set of vertices to be processed for display in advance of processing the set of vertices for display.

As will be appreciated by those skilled in the art, these aspects and embodiments can and preferably do include any one or more or all of the preferred and optional features described herein, as appropriate. Thus, for example, the subset of data that is processed by the graphics processing system preferably includes (and preferably comprises only) position data (e.g. (x, y, z) coordinates) defined for or relating to one or more and preferably each vertex in the set of vertices. Similarly, the results of the processing are preferably used when processing the set of vertices for display and/or to modify the set of vertices to be processed for display.

The processing operation or operations that is or are carried out "in advance" on or using the position data (and/or selected vertex data subsets) in these aspects and embodiments can be selected as desired, and can be any suitable or desired such operations.

In one particularly preferred embodiment, this processing comprises preparing data structures to be used for subsequent processing of the set of vertices, and/or comprises analysing the vertex data in order to deduce and/or provide information for use by the graphics system in its subsequent processing operations (e.g., and preferably, of the vertex data).

The primitives that are processed in the manner may be any suitable and desired such primitives. They are preferably in the form of simple polygons, as is known in the art. In a preferred embodiment at least the "true" primitives making up an object are triangles.

The graphics processing system can take any suitable form. As will be appreciated by those skilled in the art, it can and should comprise, as well as the particular components or features necessary to operate, the other features and components necessary to allow it to process the graphics vertex data for display.

Thus it preferably comprises, e.g., one or more of a (programmable) vertex shader unit or units, a (programmable) pixel shader unit or units, rasterising unit(s), rendering unit(s) (including, e.g., texture mapping, fogging, and/or blending units, etc.), etc., as is known in the art.

In a particularly preferred embodiment, the various functions are carried out on a single graphics processing platform that generates and outputs the data that is written to a frame buffer for a display device.

The various functions, elements, etc., can be implemented as desired, and, for example, and preferably, comprise and/or are carried out by appropriate functional units, processors, circuitry, processing logic, microprocessor arrangements, etc., that are operable to perform the various steps and functions, etc.

The technology described is applicable to any form or configuration of graphics processor, such as graphics processor having a "pipelined" arrangement. In a preferred embodiment it is applied to a hardware graphics pipeline, preferably a rendering pipeline.

The technology described is applicable to all forms of graphics processing and rendering, such as immediate mode rendering, deferred mode rendering, tile-based rendering, etc., although it is particularly applicable to graphics renderers that use deferred mode rendering and in particular to tile-based renderers.

As will be appreciated from the above, the technology described is particularly, although not exclusively, applicable to 3D graphics processors and processing devices, and accordingly extends to a 3D graphics processor and a 3D graphics processing platform including the apparatus of, or that is in accordance with, or that is operated in accordance with, any one or more of the aspects described herein. Subject to any hardware necessary to carry out the specific functions discussed above, such a 3D graphics processor can otherwise include any one or more or all of the usual functional units, etc., that 3D graphics processors include.

It will also be appreciated by those skilled in the art that all of the described aspects and embodiments can, and preferably do, include, as appropriate, any one or more or all of the preferred and optional features described herein.

The methods may be implemented at least partially using software e.g. computer programs. It will thus be seen that when viewed from further aspects computer software is specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor system, a programmable FPGA (field programmable gate array), etc.

The technology described also extends to a computer software carrier comprising such software which when used to operate a graphics processor, renderer or microprocessor system comprising data processing means causes in conjunction with said data processing means said processor, renderer or system to carry out the steps of the methods described. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods need be carried out by computer software and thus a further aspect provides computer software and such software installed on a computer software carrier for carrying out at least one of the steps of the methods set out herein.

The technology described may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of preferred embodiments will be described by way of example only and with reference to the accompanying drawings, in which.

Figure 1:
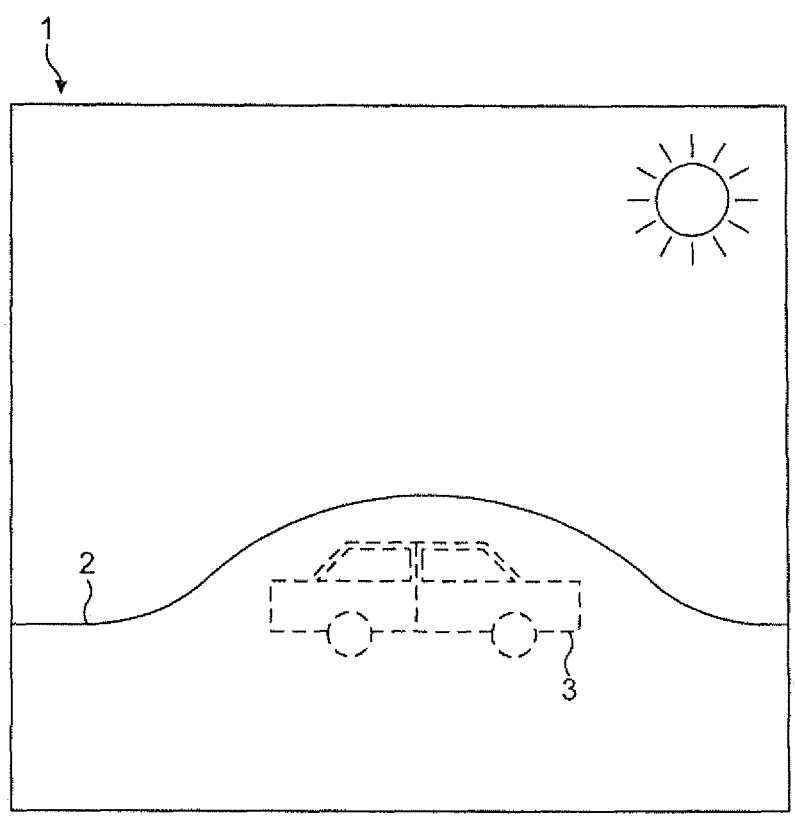
FIG. 1 shows schematically an exemplary scene to which an example method and system can usefully be applied.

FIG. 1 shows an exemplary scene 1 to be rendered by a graphics processing system to which the technology described can usefully be applied. As shown in FIG. 1, the scene comprises a foreground object 2 in the form of a hill which completely occludes another object in the form of a car 3.

As will be appreciated by those skilled in the art, the car 3 will be a complex object made up of many individual primitives and will, typically, be defined as a single draw call in the instructions that will be sent to the graphics processing system for rendering the scene 1.

In the normal operation of a graphics processing system that is not operating in accordance with the technology described, the scene 1 will be processed by taking each primitive making up the car 3 in turn, and processing that primitive to determine whether it should appear in the scene 1 as it will be displayed or not. Given that the car 3 is in fact completely occluded by the hill 2 in the scene 1, this will therefore result in this example in the processing of a significant number of primitives that will not in fact be seen.

As discussed above, the technology described recognises this possibility and proposes an alternative arrangement for processing the car 3 when rendering the scene 1. This arrangement is illustrated in FIGS. 2 and 3.

Figure 2:
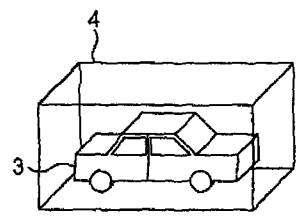
FIGS. 2, 3, 4 and 6 illustrate the operation of the example embodiments.

As shown in FIG. 2, and as discussed above, the basic principle of this embodiment is to generate a volume that represents the car 3, which volume is in this example in the form of a bounding volume 4 which surrounds the complex object (the car) 3.

Figure 3:
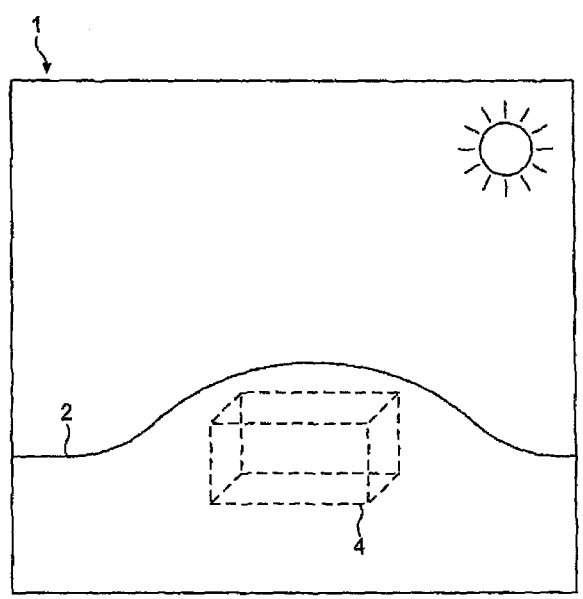

The scene 1 is then processed as shown in FIG. 3 using the bounding volume 4 in place of the actual primitives making up the car 3. This then simplifies the processing of the scene in respect of the car 3 (the complex object), since, as illustrated in FIG. 3, it can be determined that the bounding volume representation 4 of the car 3 will be completely occluded in the scene, and therefore there is no need to process the individual primitives making up the car 3. This can, as discussed above, save significantly on processing time and resources for the scene 1.

Figure 4:
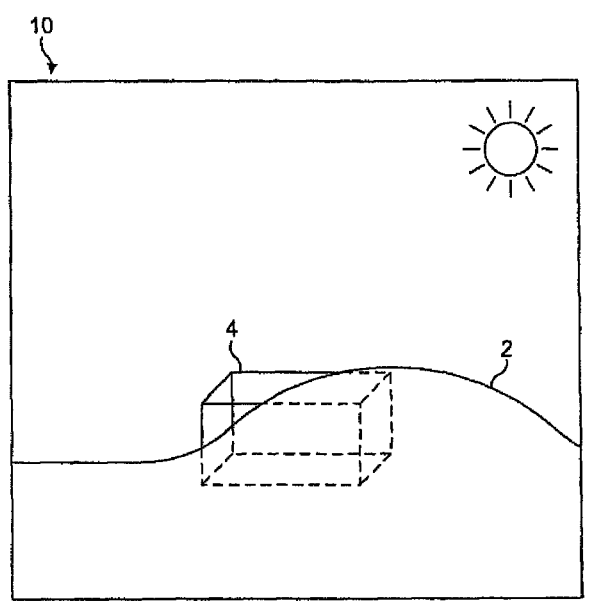

On the other hand, if it is found from processing the bounding volume 4 for the car 3 that in fact a part of that bounding volume will be present (visible) in the scene as it is to be displayed, then the system can proceed to process the actual primitives making up the car 3 to properly render the scene. This is illustrated in FIG. 4, where a slightly different scene 10 is shown in which the bounding volume 4 is not completely occluded by the hill 2.

Figure 5:
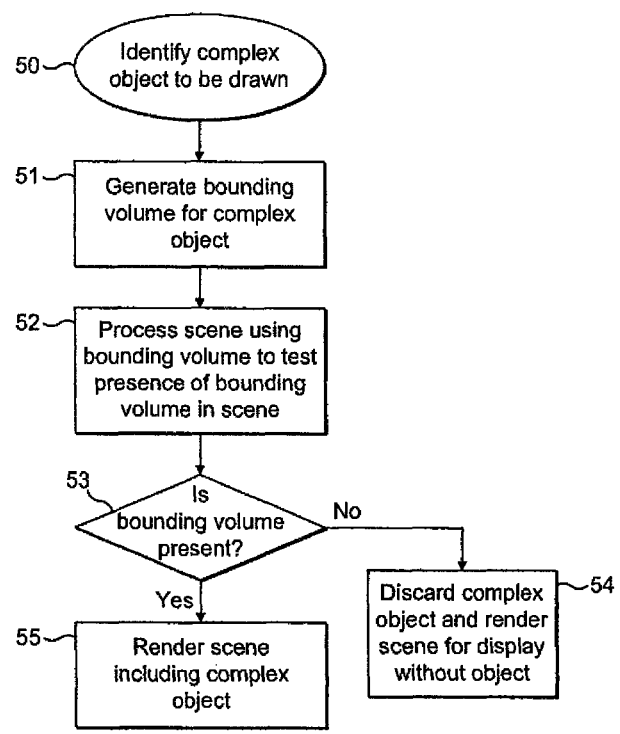
FIG. 5 is a flowchart illustrating the steps of the operation example embodiments.

FIG. 5 is a flowchart illustrating the operation as described above.

As shown in FIG. 5, the graphics processor will first receive a set of commands to render a scene for display, as is known in the art. It will then proceed to identify one or more complex objects in the scene to be displayed to which the technique will be applied (step 50).

Such identification of a complex object or objects for which the present invention will be used may be carried out as desired. For example, the graphics processor could simply identify an individual draw call or calls and treat the draw call or calls as the complex object to which the technology described is to be applied. Additionally or alternatively, other analysis of the scene could be carried out to identify suitable complex objects to apply the described techniques to, for example by assessing individual groupings of primitives and objects within a given draw call, by identifying higher order objects, such as patches or surfaces, identifying higher order parametric descriptions of objects, etc.

Once a complex object or objects has been identified, the system in this embodiment then proceeds to generate a bounding volume for that object (or for each object) (step 51).

This may be done in any suitable and desired manner, e.g. as is known in the art. For example, the maximum and minimum x, y and z positions covered by the complex object could be determined, and then a bounding volume using those maximum and minimum x, y and z positions generated, as is known in the art. Other, less coarse, bounding volume representations could equally be derived, if desired.

It would also, for example, be possible to derive a bounding "area" representing the x and y extent of the complex object and to associate that then with a depth range that the object covers, to thereby provide a bounding volume representation for the object.

(In these arrangements, the vertex data defined for the object 3 could, e.g., be assessed, the bounding volume 4 representing the object 3 created from that data, and then the bounding volume 4 transformed to the screen space for rendering. Alternatively, the vertex data defined for the object 3 could, e.g., first be transformed to screen space, and then a bounding volume 4 defined for representing the object 3 in screen-space.)

Once the bounding volume 4 has been generated, the graphics processor should then process the scene using the bounding volume representation of the complex object, rather than using the actual primitives that make up the complex object 3.

Thus, for example, one or more primitives corresponding to the bounding volume 4 will be generated, and then processed for the scene together with the other primitives (and objects) in the scene (step 52).

The primitives representing the bounding volume 4 should be treated by the processing pipeline like any other primitive. Thus, they will, for example, in the rendering pass be binned to appropriate tiles, can be culled if not in a tile at all, and can and will undergo the various forms of occlusion testing and depth testing that are provided in the rendering pipeline.

As discussed above, this processing of the scene using the bounding volume is intended to test the presence or otherwise of the bounding volume in the scene which in this embodiment is done by assessing the visibility or otherwise of the bounding volume in the scene as it is to be displayed.

Thus in the present embodiment, this processing comprises performing a Z-only rendering pass for the bounding volume representation (the primitive(s) representing the bounding volume) of the object 3, so as to determine whether or not the bounding volume representation 4 will be completely occluded in the scene as it is to be displayed or not.

The graphics processor may be set to an appropriate rendering state to facilitate such "Z-only" operation in respect of the bounding volume 4 for the complex object as desired. In a preferred implementation this is done using the technique described in the Applicant's earlier Patent Application GB-A-2420261, and by tagging the bounding volume 4 (its primitives) with an appropriate predefined rendering state index that indicates that a Z-only rendering pass is to be performed on the bounding volume 4.

The results of the Z-only rendering pass for the bounding volume 4 will, as will be appreciated by those skilled in the art determine, by means of the graphics Z-testing (depth-testing) processes, whether or not the bounding volume 4 will be visible in the scene as it is to be displayed (step 53).

In response to this determination, the graphics processor can then proceed either to discard the complex object 3 (if it is determined that the bounding volume is not visible in the scene (as it will be displayed) at all), or to render the scene with the complex object 3 (if the test determines that the bounding volume will (at least in part) be visible).

(In this embodiment the graphics processing system is triggered to now process the object 3 in its "true" individual primitive form, so that it can be properly rendered into the scene 1, by associating with the bounding volume 4 representing the object 3 suitable information, data or tags, etc., that will trigger the processing of the true primitives representing the object 3 if the bounding volume 4 is not rejected in its pass through the graphics processing system. Other arrangements would, of course, be possible.)

Thus, as shown in FIG. 5, as a consequence of the testing of the bounding volume 4, the graphics processor will either discard the complex object and then render the scene for display without the complex object 3 (step 54) or will proceed to render the scene including the complex object 3 (step 55).

In either case, the graphics processor could, for example, completely render the scene again either with the complex object 3 (but in that case rendering the actual primitives making up the complex object 3), or without the complex object 3, or, depending upon how the process is configured for processing the scene using the bounding volume 4, it may be that the scene will, in effect, already be rendered without the complex object such that it is then only necessary in the case where the complex object will be visible to re-render that part of the scene that includes the complex object.

The rendering of the scene for display (either with or without the complex object) may be carried out as desired, and is preferably done in the normal manner for the graphics processor in question.

Figure 6:
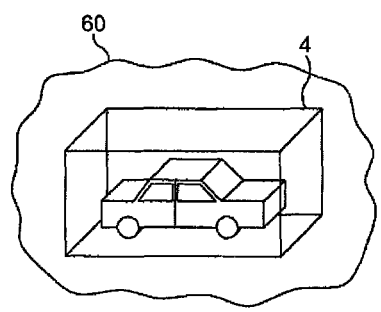

It should be noted here that an appropriately conservative "presence" (visibility) test is used for the bounding volume 4. Thus, for example, as illustrated in FIG. 6, when assessing whether the bounding volume 4 will be completely occluded in the scene, it is necessary to use a conservative test that only draws that conclusion when another object or objects 60 completely occlude the bounding volume 4.

Although the above embodiment has been described with reference to generating a single bounding volume 4 representing the complex object 3, it would be possible to generate more than one volume representing the complex object 3. This may, for example, allow different parts of the complex object to be discarded, even if some parts of the complex object will appear in the scene.

Figure 7:
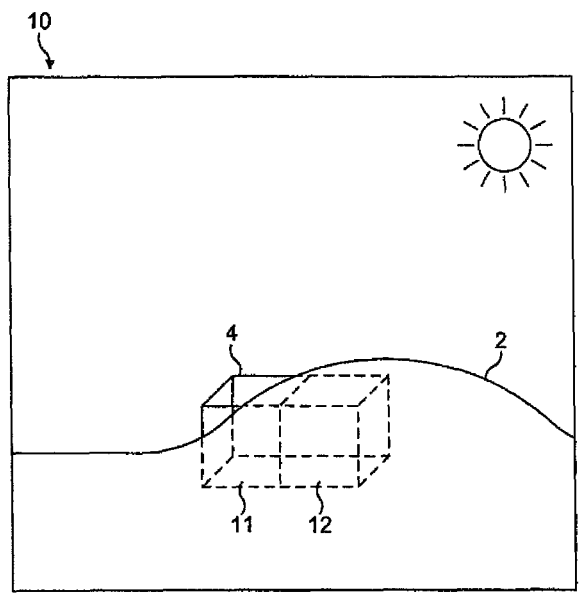
FIG. 7 shows a further preferred example embodiment.

FIG. 7 illustrates such an arrangement. In this case, the overall "bounding volume" 4 representing the car 3 is divided into two smaller representative volumes 11, 12, each of which will be tested. In this case, it will accordingly be determined that the volume 11 will need to be rendered for display, but the part of the complex object encompassed by the volume 12 can be discarded.

Figure 8:
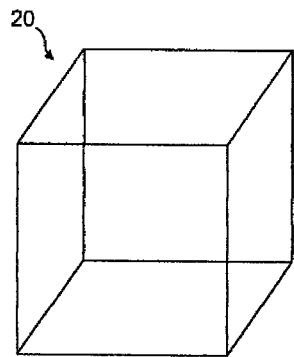
FIGS. 8, 9 and 10 show a further preferred example arrangement.
Figure 9:
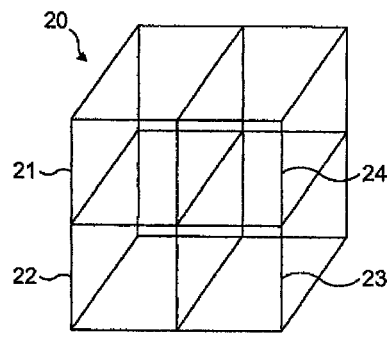
Figure 10:
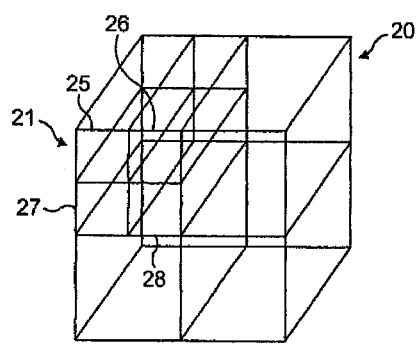

In a particularly preferred embodiment, the graphics processor is operable to progressively subdivide the bounding volume generated for a complex object in order to see if different parts of the object can be discarded from processing. FIGS. 8, 9 and 10 illustrate this.

FIG. 8 shows an exemplary initial bounding volume 20 for a complex object.

In this arrangement, if it is found that that bounding volume 20 will be present in the scene to be displayed, then as illustrated in FIG. 9, the system proceeds to subdivide the initial bounding volume 20 into four smaller volumes, 21, 22, 23 and 24.

Each such smaller volume is then tested, and if any are found to be completely occluded, they are discarded, as discussed above.

If any of the smaller volumes 21, 22, 23 and 24 in FIG. 9 are found still to be present in the scene, then those volumes are further subdivided in the same manner.

FIG. 10 illustrates this for the volume 21, and shows that volume subdivided into four smaller volumes, 25, 26, 27 and 28, which again can be tested in the manner described and discarded if appropriate.

Such subdivision and testing of progressively smaller representative volumes may be repeated as desired, for example up to some predetermined or selected subdivision limit.

Although described above with particular reference to determining whether or not the complex object will be present in the scene as it is to be displayed, the Applicants have further recognised that it would equally be possible to test whether the complex object may occlude other objects in the scene in similar fashion.

In this case, a coarser representation of the complex object 3 will again be generated and used in an occlusion testing process, but this time to determine whether or not other objects in the scene can be discarded on the basis that they will be occluded by the complex object.

In this case, rather than generating a "bounding" volume that encompasses the complex object 3, a "bounded" volume, i.e. a volume that is definitely enclosed within the complex object (that definitely represents space enclosed within the complex object), is generated.

Figure 11:
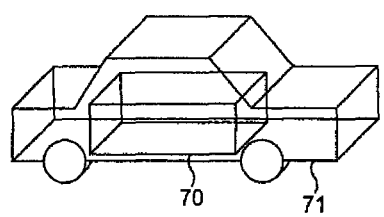
FIG. 11 illustrates a yet further example embodiment.

FIG. 11 illustrates this, and shows an exemplary bounded volume 70 generated for a complex object 71.

This bounded volume 70 may again be generated as desired, for example by considering the appropriate x, y and z value ranges that will definitely be encompassed by the complex object 71. It would also be possible, e.g., to generate 2 (or more) bounded volumes, each falling entirely within the complex object (e.g. representing different parts of the complex object), if desired.

Once the appropriate bounded volume 70 for the complex object has been derived, then again the scene can be processed using that bounded volume to represent the complex object 71 and to determine accordingly whether the complex object will occlude any other objects, primitives, etc., that appear in the scene (such that they can then be discarded).

Again, the processing in respect of the bounded volume 70 is preferably performed as a Z-only rendering pass and the bounded volume 70 is preferably used in a similar manner to the "bounding volume" discussed above to allow objects that will be occluded by the complex object 3 to be discarded.

It will be appreciated here that the generation and testing of the bounded volume for a complex object should be carried out in an appropriately conservative basis, to ensure that bounded volume does not, for example, encompass any scene volume or area that is not in fact occupied by (that will not be occluded by) the complex object.

It should equally be appreciated here that any or all of the optional and preferred techniques discussed herein in relation to the use of a "bounding volume", may equally be (appropriately) applied to arrangements where a "bounded volume" is generated for a complex object.

In a particularly preferred embodiment, a bounding volume (or volumes) and a bounded volume (or volumes) is generated for a given complex object, with each such volume then being processed in the manners discussed above. Most preferably this is done for a plurality of complex objects in the scene. This may, e.g., then allow one or more of those objects to be discarded from processing for the scene.

The technology described can be implemented in a graphics processing system and using a graphics processor in any suitable manner, and as desired.

Figure 12:
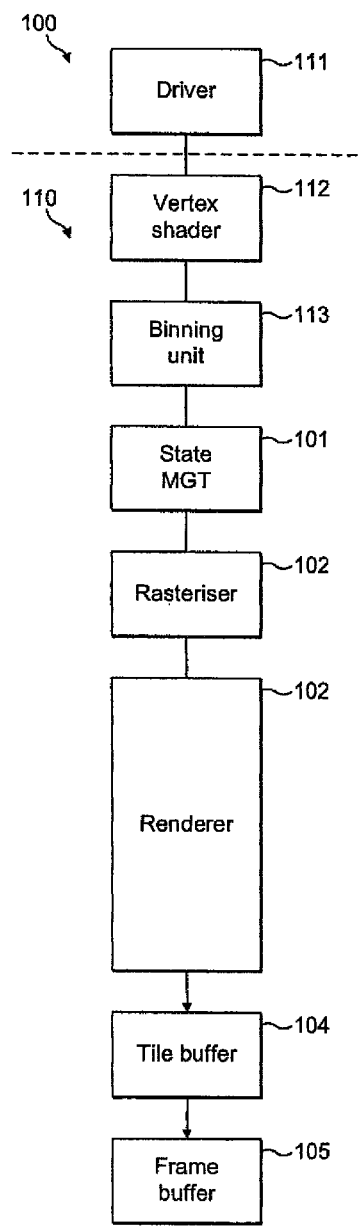
FIG. 12 shows schematically a graphics processor.

FIG. 12 shows schematically an arrangement of a graphics processing system 100.

FIG. 12 shows a tile-based graphics processing system. However, as will be appreciated, and as discussed above, the technology described can be implemented in other arrangements of graphics processing system as well.

As shown in FIG. 12, the graphics processing system 100 includes a graphics processor 110, and a driver 111 for the graphics processor which will, as is known in the art, typically reside and run on a host CPU (processor) to which the graphics processor 110 is coupled. The driver 111 will, as is known in the art, send lists of commands and data, etc., to the graphics processor to instruct it to render graphics for display in response to calls for graphics display from applications, etc., running on the host processor.

As shown in FIG. 12, the graphics processor 110 includes a vertex shader 112, a binning unit 113, a state management unit 101, a rasterising stage 102, and a rendering stage 103 in the form of a rendering pipeline.

The vertex shader 112 takes, as is known in the art, descriptions of graphics objects to be drawn, vertices, etc., from the driver 111 and performs appropriate vertex shading operations on those objects and vertices, etc., so as to, for example, perform appropriate transform and lighting operations on the objects and vertices.

The binning unit 113 sorts (bins), as is known in the art, the various primitives, objects, etc., required for a scene into the appropriate bins (tile lists) for the tiles that the scene to be displayed is divided into (since, as discussed above, this exemplary graphics processing system is a tile-based graphics processing system).

The state management unit 101 stores and controls state data and the state of the graphics processing units to control the graphics processing operation, as is known in the art.

The rasteriser 102 takes as its input primitives to be displayed, and rasterises those primitives to fragment positions (fragments) to be rendered, as is known in the art.

The rendering pipeline 103 takes fragments from the rasteriser 102 and renders those fragments for display. As is known in the art, the rendering pipeline will include a number of different processing units, such as fragment shaders, blenders, texture mappers, etc.

The output from the rendering pipeline 103 (the rendered fragments) is output to tile buffers 104 (since the present embodiment is a tile-based system). The tile buffers' outputs are then finally output to a frame buffer 105 for display.

It will be appreciated that each of the stages, elements, and units, etc., of the graphics processor as shown in FIG. 12 may be implemented as desired and will accordingly comprise, e.g., appropriate circuitry, and/or processing logic, programmable logic, etc., for performing the necessary operations and functions.

In operation of this graphics processing system 110, the driver 111 will, for example, will operate to identify appropriate complex objects that it is to command the graphics processor 110 to render for display, and may then either control the host processor to generate appropriate representative volumes for those objects or provide appropriate instructions to the vertex shader 112 of the graphics processor 110 to generate the desired representative volumes, and to then command the remaining units and stages of the graphics processor 110 to process those representative volumes accordingly.

In this regard, it will, as will be appreciated by those skilled in the art, be the operations of the binning unit 113, the rasteriser 102 and the tile buffer 104 that may in particular be controlled to perform the appropriate, e.g., Z-only processing in respect of the representative volume for an object.

Other arrangements would, of course, be possible. For example, the vertex shader 112 could be configured both to identify appropriate, e.g., complex, objects in a scene to be rendered and to then generate the appropriate representative volume or volumes for such objects and trigger operation in the manner accordingly.

It will also be appreciated here that FIG. 12 simply shows the arrangements schematically, and thus, for example, the data flow in operation need not and may not be as shown in FIG. 12, but may, for example, involve the looping back of data as between the various units and stages shown in FIG. 12 as appropriate. As will be appreciated by those skilled in the art, any appropriate data flow can be used.

It can be seen from the above that example embodiments provide an arrangement for handling complex objects in scenes to be rendered that can provide more efficient and effective processing of such objects.

This is achieved, in preferred embodiments, by first representing the complex object using a bounding volume and/or a bounded volume, and then processing the scene using the bounding volume and/or bounded volume to represent the object so as to assess, for example, the presence or otherwise of the complex object in the scene, before performing a full rendering operation on the complex object.

The invention claimed is:

1. A method of processing a scene for display in a graphics processing system, the method comprising:
    identifying an object in the scene;
    generating a first bounding volume representing the object in the scene;
    processing some or all of the scene by performing a depth-only rendering pass in respect of the generated first bounding volume for the object to assess whether the first bounding volume representing the object is at least partially occluded by one or more other objects in the scene as it will be displayed; and
    determining whether or not to process the object for display on the basis of the assessment;
    wherein the graphics processing system is configured to operate in a plurality of rendering states, one of said rendering states being a depth-only rendering state, the method further comprising:
    tagging the first bounding volume and/or its corresponding primitive or primitives with a rendering state index or predefined fragment program address such that the graphics processing system, on recognizing said rendering state index or predefined fragment program address, will operate in said depth-only rendering state when processing the first bounding volume;
    the method further comprising, if it is determined by the depth-only rendering pass that at least part of the first bounding volume is present in the scene as it will be displayed, then:
    generating two or more second bounding volumes each representing different parts of the first bounding volume;
    processing some or all of the scene by performing a depth-test in respect of the generated two or more second bounding volumes for the object to assess whether the two or more second bounding volumes are at least partially occluded by one or more other objects in the scene as it will be displayed; and
    determining whether or not to process one or more parts of the object for display on the basis of the assessment.

2. The method of claim 1, comprising generating two or more volumes representing the object.

3. A method of processing a scene for display in a graphics processing system, the method comprising:
    identifying an object in the scene;
    generating a first bounded volume representing the object in the scene;
    processing some or all of the scene by performing a depth-only rendering pass in respect of the generated first bounded volume for the object to assess whether the first bounded volume representing the object will at least partially occlude one or more other objects in the scene as it will be displayed; and
    determining whether or not to process one or more other objects of the scene for display on the basis of the assessment;
    wherein the graphics processing system is configured to operate in a plurality of rendering states, one of said rendering states being a depth-only rendering state, the method further comprising:
    tagging the first bounded volume and/or its corresponding primitive or primitives with a rendering state index or predefined fragment program address such that the graphics processing system, on recognizing said rendering state index or predefined fragment program address, will operate in said depth-only rendering state when processing the first bounded volume;
    the method further comprising, if it is determined by the depth-only rendering pass that the first bounded volume partially occludes one or more other objects in the scene as it will be displayed, then:
    generating two or more second bounded volumes representing the object;
    processing some or all of the scene by performing a depth-test in respect of the generated two or more second bounded volumes for the object to assess whether the two or more second bounded volumes will at least partially occlude one or more other objects in the scene as it will be displayed; and determining whether or not to process one or more other objects of the scene for display on the basis of the assessment.

4. A method of processing a scene for display in a graphics processing system, the method comprising:

identifying an object in the scene;

generating a first bounding volume representing the object in the scene;

processing some or all of the scene by performing a depth-only rendering pass in respect of the generated first bounding volume for the object to assess whether the first bounding volume representing the object is at least partially occluded by one or more other objects in the scene as it will be displayed; and determining whether or not to process the object for display on the basis of the assessment;

the method further comprising:

generating a bounded volume representing the object in the scene;

processing some or all of the scene using the generated bounded volume for the object to assess whether the bounded volume representing the object will at least partially occlude one or more other objects in the scene as it will be displayed; and determining whether or not to process one or more other objects of the scene for display on the basis of the assessment;

the method further comprising, if it is determined by the depth-only rendering pass that at least part of the first bounding volume is present in the scene as it will be displayed, then:

generating two or more second bounding volumes each representing different parts of the first bounding volume;

processing some or all of the scene by performing a depth-test in respect of the generated two or more second bounding volumes for the object to assess whether the two or more second bounding volumes are at least partially occluded by one or more other objects in the scene as it will be displayed; and determining whether or not to process one or more parts of the object for display on the basis of the assessment.

5. A graphics processing system comprising:

control circuitry for identifying an object in a scene to be processed for display;

processing circuitry for generating a first bounding volume representing the object in the scene;

graphics processing circuitry for processing some or all of the scene by performing a depth-only rendering pass in respect of the generated first bounding volume for the object to assess whether the first bounding volume representing the object is at least partially occluded by one or more other objects in the scene as it will be displayed; and control circuitry for determining whether or not to process the object for display on the basis of the assessment;

wherein the graphics processing system is configured to operate in a plurality of rendering states, one of said rendering states being a depth-only rendering state, the system further comprising:

processing circuitry for tagging the first bounding volume and/or its corresponding primitive or primitives with a rendering state index or predefined fragment program address such that the graphics processing system, on recognizing said rendering state index or predefined fragment program address, will operate in said depth-only rendering state when processing the first bounding volume;

processing circuitry for generating two or more second bounding volumes each representing different parts of the first bounding volume if it is determined by the depth-only rendering pass that at least part of the first bounding volume is present in the scene as it will be displayed;

graphics processing circuitry for processing some or all of the scene by performing a depth-test in respect of the generated two or more second bounding volumes for the object to assess whether the two or more second bounding volumes are at least partially occluded by one or more other objects in the scene as it will be displayed; and control circuitry for determining whether or not to process one or more parts of the object for display on the basis of the assessment.

6. A graphics processing system comprising:

control circuitry configured to identify an object in a scene to be processed for display;

processing circuitry configured to generate a first bounded volume representing the object in the scene;

graphics processing circuitry configured to process some or all of the scene by performing a depth-only rendering pass in respect of the generated first bounded volume for the object to assess whether the first bounded volume representing the object will at least partially occlude one or more other objects in the scene as it will be displayed; and control circuitry configured to determine whether or not to process one or more other objects of the scene for display on the basis of the assessment;

wherein the graphics processing system is configured to operate in a plurality of rendering states, one of said rendering states being a depth-only rendering state, the system further comprising:

processing circuitry configured to tag the first bounded volume and/or its corresponding primitive or primitives with a rendering state index or predefined fragment program address such that the graphics processing system, on recognizing said rendering state index or predefined fragment program address, will operate in said depth-only rendering state when processing the first bounded volume;

processing circuitry configured to generate two or more second bounded volumes representing one object if it is determined by the depth-only rendering pass that the first bounded volume partially occludes one or more other objects in the scene as it will be displayed; and graphics processing circuitry configured to process some or all of the scene by performing a depth-test in respect of the generated two or more second bounded volumes for the object to assess whether the two or more second bounded volumes will at least partially occlude one or more other objects in the scene as it will be displayed; and control circuitry configured to determine whether or not to process one or more other objects of the scene for display on the basis of the assessment.

7. A graphics processing system comprising:

control circuitry configured to identify an object in a scene to be processed for display;

processing circuitry configured to generate a first bounding volume representing the object in the scene;

graphics processing circuitry configured to process some or all of the scene by performing a depth-only rendering pass in respect of the generated first bounding volume for the object to assess whether the first bounding volume representing the object is at least partially occluded by one or more other objects in the scene as it will be displayed; and control circuitry configured to determine whether or not to process the object for display on the basis of the assessment;

the system further comprising:

processing circuitry configured to generate a bounded volume representing the object in the scene;

graphics processing circuitry configured to process some or all of the scene using the generated bounded volume for the object to assess whether the bounded volume representing the object will at least partially occlude one or more other objects in the scene as it will be displayed; and control circuitry configured to determine whether or not to process one or more other objects of the scene for display on the basis of the assessment;

the system further comprising:

processing circuitry configured to generate two or more second bounding volumes each representing different parts of the first bounding volume if it is determined by the depth-only rendering pass that at least part of the first bounding volume is present in the scene as it will be displayed;

graphics processing circuitry configured to process some or all of the scene by performing a depth-test in respect of the generated two or more second bounding volumes for the object to assess whether the two or more second bounding volumes are at least partially occluded by one or more other objects in the scene as it will be displayed; and control circuitry configured to determine whether or not to process one or more parts of the object for display on the basis of the assessment.

8. A graphics processor comprising:

control circuitry for identifying an object in a scene to be processed for display;

processing circuitry for generating a first bounding volume representing the object in the scene;

graphics processing circuitry for processing some or all of the scene by performing a depth-only rendering pass in respect of the generated first bounding volume for the object to assess whether the first bounding volume representing the object is at least partially occluded by one or more other objects in the scene as it will be displayed; and control circuitry for determining whether or not to process the object for display on the basis of the assessment;

wherein the graphics processor is configured to operate in a plurality of rendering states, one of said rendering states being a depth-only rendering state, the processor further comprising:

processing circuitry for tagging the first bounding volume and/or its corresponding primitive or primitives with a rendering state index or predefined fragment program address such that the graphics processor, on recognizing said rendering state index or predefined fragment program address, will operate in said depth-only rendering state when processing the first bounding volume;

processing circuitry for generating two or more second bounding volumes each representing different parts of the first bounding volume if it is determined by the depth-only rendering pass that at least part of the first bounding volume is present in the scene as it will be displayed;

graphics processing circuitry for processing some or all of the scene by performing a depth-test in respect of the generated two or more second bounding volumes for the object to assess whether the two or more second bounding volumes are at least partially occluded by one or more other objects in the scene as it will be displayed; and control circuitry for determining whether or not to process one or more parts of the object for display on the basis of the assessment.

9. A graphics processor comprising:

control circuitry for identifying an object in a scene to be processed for display;

processing circuitry for generating a first bounded volume representing the object in the scene;

graphics processing circuitry for processing some or all of the scene by performing a depth-only rendering pass in respect of the generated first bounded volume for the object to assess whether the first bounded volume representing the object will at least partially occlude one or more other objects in the scene as it will be displayed; and control circuitry for determining whether or not to process one or more other objects of the scene for display on the basis of the assessment;

wherein the graphics processor is configured to operate in a plurality of rendering states, one of said rendering states being a depth-only rendering state, the processor further comprising:

processing circuitry for tagging the first bounded volume and/or its corresponding primitive or primitives with a rendering state index or predefined fragment program address such that the graphics processor, on recognizing said rendering state index or predefined fragment program address, will operate in said depth-only rendering state when processing the first bounded volume;

processing circuitry configured to generate two or more second bounded volumes representing one object if it is determined by the depth-only rendering pass that the first bounded volume partially occludes one or more other objects in the scene as it will be displayed; and graphics processing circuitry configured to process some or all of the scene by performing a depth-test in respect of the generated two or more second bounded volumes for the object to assess whether the two or more second bounded volumes will at least partially occlude one or more other objects in the scene as it will be displayed; and control circuitry configured to determine whether or not to process one or more other objects of the scene for display on the basis of the assessment.

10. A graphics processor comprising:

control circuitry for identifying an object in a scene to be processed for display;

processing circuitry for generating a first bounding volume representing the object in the scene;

graphics processing circuitry for processing some or all of the scene using the generated first bounding volume for the object to assess whether the first bounding volume representing the object is at least partially occluded by one or more other objects in the scene as it will be displayed; and control circuitry for determining whether or not to process the object for display on the basis of the assessment;

the processor further comprising:
processing circuitry for generating a bounded volume representing the object in the scene;
graphics processing circuitry for processing some or all of the scene by performing a depth-only rendering pass in respect of the generated bounded volume for the object to assess whether the bounded volume representing the object will at least partially occlude one or more other objects in the scene as it will be displayed; and
control circuitry for determining whether or not to process one or more other objects of the scene for display on the basis of the assessment;
the processor further comprising:
processing circuitry for generating two or more second bounding volumes each representing different parts of the first bounding volume if it is determined by the depth-only rendering pass that at least part of the first bounding volume is present in the scene as it will be displayed;
graphics processing circuitry for processing some or all of the scene by performing a depth-test in respect of the generated two or more second bounding volumes for the object to assess whether the two or more second bounding volumes are at least partially occluded by one or more other objects in the scene as it will be displayed; and
control circuitry for determining whether or not to process one or more parts of the object for display on the basis of the assessment.

11. A computer program product comprising computer software code stored in a non-transitory computer readable medium for performing, when the software code is run on a data processor of a graphics processing system, processing of a scene for display, comprising:
identifying an object in the scene;
generating a first bounding volume representing the object in the scene;
processing some or all of the scene by performing a depth-only rendering pass in respect of the generated first bounding volume for the object to assess whether the first bounding volume representing the object is at least partially occluded by one or more other objects in the scene as it will be displayed; and
determining whether or not to process the object for display on the basis of the assessment;
wherein the graphics processing system is configured to operate in a plurality of rendering states, one of said rendering states being a depth-only rendering state, and
tagging the first bounding volume and/or its corresponding primitive or primitives with a rendering state index or predefined fragment program address such that the graphics processing system, on recognizing said rendering state index or predefined fragment program address, will operate in said depth-only rendering state when processing the first bounding volume;
wherein the method further comprises, if it is determined by the depth-only rendering pass that at least part of the first bounding volume is present in the scene as it will be displayed, then:
generating two or more second bounding volumes each representing different parts of the first bounding volume;
processing some or all of the scene by performing a depth-test in respect of the generated two or more second bounding volumes for the object to assess whether the two or more second bounding volumes are at least partially occluded by one or more other objects in the scene as it will be displayed; and
determining whether or not to process one or more parts of the object for display on the basis of the assessment.

12. A computer program product comprising computer software code stored in a non-transitory computer readable medium for performing, when the software code is run on a data processor of a graphics processing system, processing of a scene for display, comprising:
identifying an object in the scene;
generating a first bounded volume representing the object in the scene;
processing some or all of the scene by performing a depth-only rendering pass in respect of the generated first bounded volume for the object to assess whether the first bounded volume representing the object will at least partially occlude one or more other objects in the scene as it will be displayed; and
determining whether or not to process one or more other objects of the scene for display on the basis of the assessment;
wherein the graphics processing system is configured to operate in a plurality of rendering states, one of said rendering states being a depth-only rendering state, and
tagging the first bounded volume and/or its corresponding primitive or primitives with a rendering state index or predefined fragment program address such that the graphics processing system, on recognizing said rendering state index or predefined fragment program address, will operate in said depth-only rendering state when processing the first bounded volume;
the method further comprising, if it is determined by the depth-only rendering pass that the first bounded volume partially occludes one or more other objects in the scene as it will be displayed, then:
generating two or more second bounded volumes representing the object;
processing some or all of the scene by performing a depth-test in respect of the generated two or more second bounded volumes for the object to assess whether the two or more second bounded volumes will at least partially occlude one or more other objects in the scene as it will be displayed; and
determining whether or not to process one or more other objects of the scene for display on the basis of the assessment.

13. A computer program product comprising computer software code stored in a non-transitory computer readable medium for performing, when the software code is run on a data processor of a graphics processing system, processing of a scene for display, comprising:
identifying an object in the scene;
generating a first bounding volume representing the object in the scene;
processing some or all of the scene by performing a depth-only rendering pass in respect of the generated first bounding volume for the object to assess whether the first bounding volume representing the object is at least partially occluded by one or more other objects in the scene as it will be displayed; and
determining whether or not to process the object for display on the basis of the assessment;
and further comprising:
generating a bounded volume representing the object in the scene;

processing some or all of the scene using the generated bounded volume for the object to assess whether the bounded volume representing the object will at least partially occlude one or more other objects in the scene as it will be displayed; and determining whether or not to process one or more other objects of the scene for display on the basis of the assessment;

the method further comprising, if it is determined by the depth-only rendering pass that at least part of the first bounding volume is present in the scene as it will be displayed, then:

generating two or more second bounding volumes each representing different parts of the first bounding volume;

processing some or all of the scene by performing a depth-test in respect of the generated two or more second bounding volumes for the object to assess whether the two or more second bounding volumes are at least partially occluded by one or more other objects in the scene as it will be displayed; and determining whether or not to process one or more parts of the object for display on the basis of the assessment.

* * * * *